United States Patent [19]

Lindner et al.

[11] Patent Number: 5,421,436
[45] Date of Patent: Jun. 6, 1995

[54] ORIENTATION-FREE BRAKE MECHANISM

[75] Inventors: Bernard J. Lindner, Brookfield; Harold Lorenz, Greenfield; Jerry L. Hamberger, West Allis; Walter G. Stelzer, Pewaukee, all of Wis.

[73] Assignee: Rexnord Corporation, Milwaukee, Wis.

[21] Appl. No.: 197,733

[22] Filed: Feb. 17, 1994

[51] Int. Cl.⁶ ............. B60T 13/04; F16D 65/40; F16D 66/00
[52] U.S. Cl. ............. 188/171; 188/1.11; 188/73.38; 192/70.27; 192/30 W; 192/90; 192/84 A
[58] Field of Search ............. 188/1.11 R, 72.3, 72.9, 188/73.38, 171, 205 A; 192/70.27, 70.28, 30 W, 90, 84 A; 49/490.1; 340/454; 200/61.4

[56] References Cited

U.S. PATENT DOCUMENTS

| | | | |
|---|---|---|---|
| 2,036,569 | 4/1936 | Darbyshire | 49/490.1 X |
| 2,766,494 | 10/1956 | Stremmel | 49/490.1 X |
| 3,045,782 | 7/1962 | Hansen | 188/171 |
| 3,249,189 | 5/1966 | Schjolin et al. | 192/70.28 |
| 3,997,782 | 12/1976 | Willits | 250/231 SE |
| 4,020,454 | 4/1977 | Malonee | 340/454 X |
| 4,042,077 | 8/1977 | McCarthy | 188/171 |
| 4,121,207 | 10/1978 | Jones | 200/61.4 X |
| 4,142,610 | 3/1979 | Alexander et al. | 188/171 X |
| 4,181,201 | 1/1980 | McCarthy | 188/171 |
| 4,483,422 | 11/1984 | Cory | 188/72.3 X |
| 4,798,269 | 1/1989 | Lindner et al. | 188/171 |
| 4,940,124 | 7/1990 | Galuska et al. | 192/70.28 |
| 5,186,287 | 2/1993 | Lindner et al. | 188/171 |
| 5,255,760 | 10/1993 | Lamb et al. | 188/1.11 |

FOREIGN PATENT DOCUMENTS 446143 3/1949 Italy .................. 192/70.28

OTHER PUBLICATIONS

Stearns® Spring–Set Disc Brakes Parts List for 55,000 series, PTC Sheet 309, p. S–607–1 effective Oct. 31, 1985.
Stearns Spring–Set Disc Brakes, Catalog No. 200, 68910M, Stearns Division, ©Copyright 1989 by Rexnord Corporation.

Primary Examiner—Robert J. Oberleitner
Assistant Examiner—Kevin D. Rutherford
Attorney, Agent, or Firm—Andrus, Sceales, Starke & Sawall

[57] ABSTRACT

A brake assembly (10) for selectively starting and stopping rotation of a shaft (12) journaled in a frame (14) of a motor comprises an end plate (16) mounted to the motor frame, the end plate (16) being formed with mounting slots (40) formed axially therein. Friction discs (26, 26a) are secured to the shaft (12) for rotation therewith about the longitudinal axis of the shaft (12) and pressure plates (36, 36a, 36b) are non-rotatably mounted in the mounting slots (40) of the end plates (16) and axially movable toward and away from the friction discs (26, 26a). Separator springs (124) are slidably mounted around a peripheral portion of the pressure plates (36, 36a) mounted in the mounting slots (40) for urging the pressure plates (36, 36a) away from the friction discs (26, 26a) to minimize brake drag caused by contact of the pressure plates (36, 36a, 36b) and the friction discs (26, 26a) during rotation of the shaft (12), and for suppressing noise and wear caused by contact of the pressure plates (36, 36a) relative to the end plate (16) during brake operation.

12 Claims, 6 Drawing Sheets

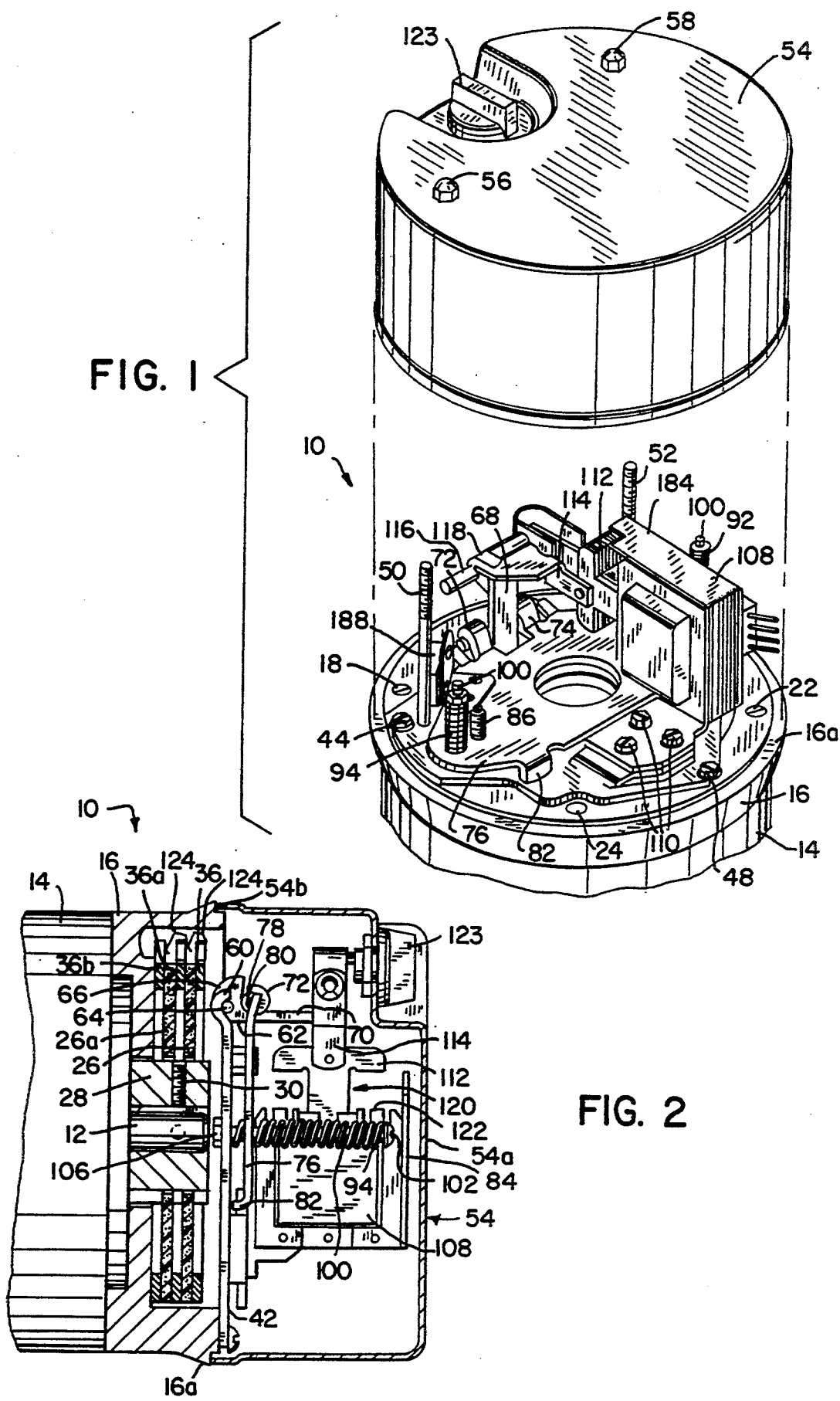

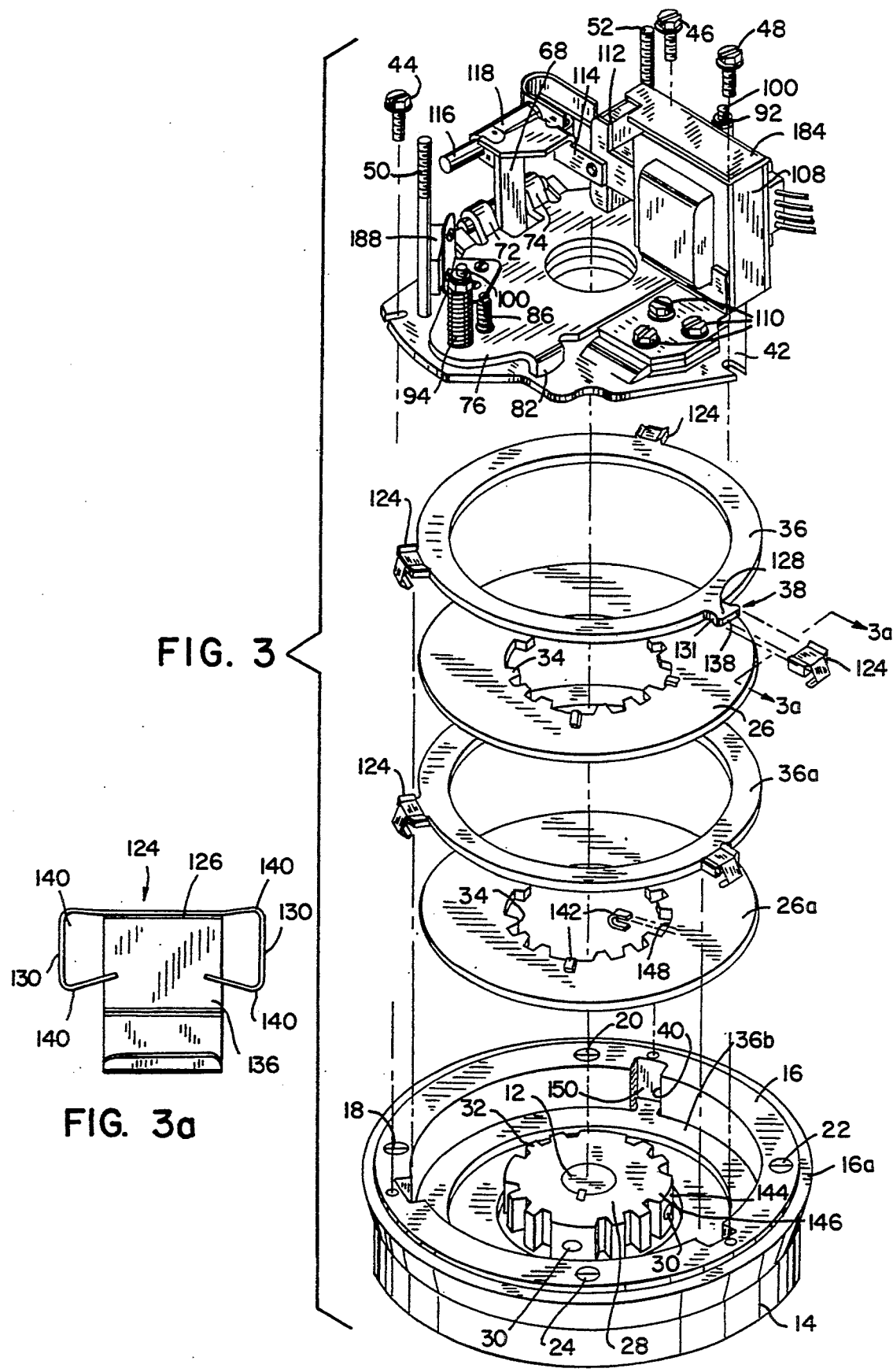

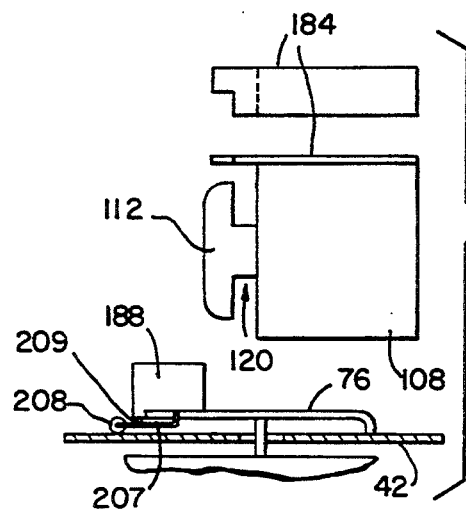
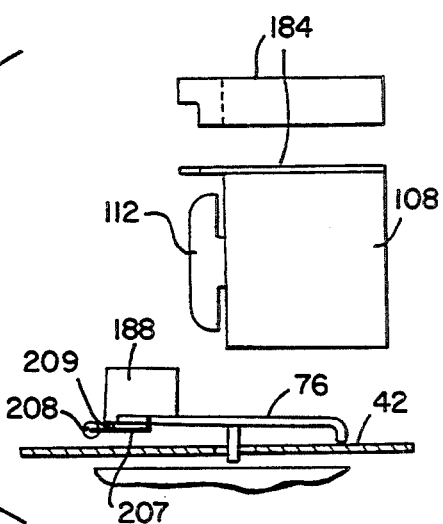
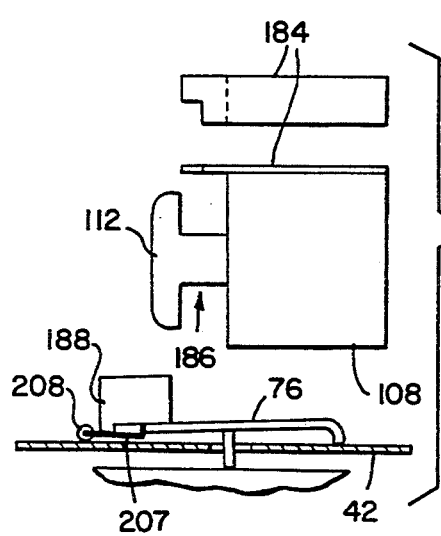
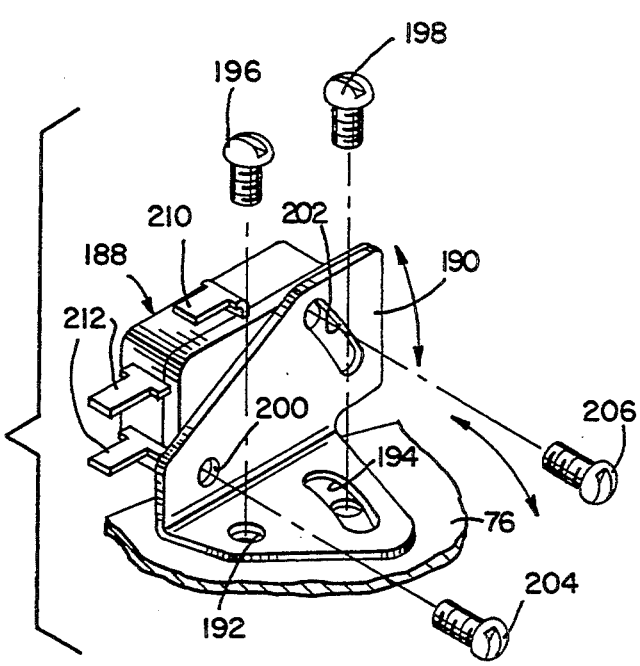

ORIENTATION-FREE BRAKE MECHANISM

BACKGROUND AND SUMMARY OF THE INVENTION

This invention relates generally to brake mechanisms for electric motors and the like and, more particularly, pertains to spring-set, electromagnetically released brake mechanisms having minimal brake drag, advanced noise and wear suppression and improved sealing capability.

The invention arose during continuing development efforts relating to motor assemblies having brake mechanisms such as shown in U.S. Pat. Nos. 5,186,287, 4,798,269, 4,181,201 and 4,042,077 and as shown in "Stearns Spring-Set Disc Brakes", Catalog No. 200, 68910M, Stearns Division, Rexnord Corporation, 1989 and Stearns Spring-Set Disc Brakes Parts List for 55,000 Series, Sheet 309, effective Oct. 31, 1985, page S-607-1, Stearns Division, Rexnord Corporation.

The brake mechanism selectively stops or permits rotation of a shaft journaled in the motor frame. One or more friction discs secured to the shaft rotate therewith about the axis of the shaft. An end plate is secured to the motor frame, and has one or more non-rotatable pressure plates mounted thereto for axial movement toward and away from the friction discs. A lever is mounted to the end plate for pivotal movement toward and away from the pressure plates. Compression springs bias the lever against the pressure plates such that the pressure plates engage the friction discs and prevent rotation of the motor shaft. A solenoid is secured to the support plate and has a reciprocally movable plunger connected to the lever and movable to a first position moving the lever one axial direction away from the pressure plates against the bias of the compression springs to release the friction discs and permit rotation of the shaft. The plunger is movable to a second position permitting the lever to move under the bias of the compression springs in the opposite axial direction toward and engaging the pressure plates such that the pressure plates engage the friction discs and prevent rotation of the shaft. This basic structure is common in the industry.

The present invention provides enhancements in cost reduction, ease of maintenance and improved performance and life.

In one aspect of the invention, slots formed in the end plate are utilized for accepting separator springs biasing the pressure plates away from the friction discs in the released condition of the brake to minimize brake drag otherwise caused by contact of the pressure plates and friction discs during rotation of the motor shaft. In vertically mounted orientations of the motor brake, the gravitational weight of the pressure plates themselves may cause brake drag against the friction discs during rotation of the motor shaft. It is known in the prior art to secure leaf springs to the end plate to minimize brake drag as shown in U.S. Pat. No. 4,798,269. It is also known in the prior art to provide low force compression springs around pins secured to the end plate for performing such function, as shown in "Stearns Spring-Set Disc Brakes Part List for 55,000 Series", PTC sheet 309, Oct. 31, 1985, page S-607-1, FIGS. H, I, J, K and L. In the later embodiment, the brake must be specially modified by drilling holes in the end plate and in outer protrusions of the pressure plates, and inserting pins into such holes, which pins receive the low force compression springs. It is further known in the prior art to use low force compression springs around a plurality of studs which non-rotatably mount the pressure plates to the end plates and are spaced circumferentially around the friction discs as shown in U.S. Pat. No. 5,186,287. Depending on the nature of the brake application, various size leaf springs and low force compression springs must be installed for proper brake operation. The separator springs of the present invention not only minimize brake drag, but also significantly muffle the rattling backlash caused by the pressure plates in the slots of the end plate. In addition, the separator springs effectively prevent portions of the pressure plate which are normally thrusted into the slots from rotational forces during braking from gouging into the slots, thereby reducing braking torque.

In another aspect of the invention, a housing having an open end is operatively connected to the end plate for enclosing the brake mechanism and the sealing arrangement surrounding the open end of the housing is utilized for sealing the juncture between the end plate and the housing. A hub secured to the shaft and mating with the friction discs is provided with a radial seal retained in the end plate on an end adjacent the motor frame. Housing fasteners are provided with sealing rings between the heads of the fasteners and the wall of the housing to complete a dust-tight, waterproof seal and retain the housing in position against the end plate.

In another aspect of the invention, friction discs are secured to the shaft for rotation above the axis of the shaft, an end plate is secured to the motor frame, and non-rotatable pressure plates are mounted to the end plate for axial movement toward and away from the friction discs. A support plate is connected to the end plate and a lever is mounted to the support plate for pivotal movement toward and away from the pressure plates. A biasing arrangement biases the lever against the pressure plates such that the pressure plates engage the friction discs and prevent rotation of the shaft. A solenoid device is secured to the support plate and has a reciprocally mounted plunger operatively connected to the lever and movable between a first position to release the friction discs and prevent rotation of the shaft, and a second position to engage friction discs to prevent rotation of the shaft. Separator springs enveloping certain peripheral portions of the pressure plates are utilized for urging the pressure plates away from the friction discs in the first position of the plunger to minimize brake drag caused by contact of the pressure plates and the friction discs during rotation of the shaft, and for suppressing noise and wear caused by contact of the certain peripheral portions of the pressure plates relative to the end plate during operation of the brake mechanism.

In another aspect of the invention, a switching arrangement is provided to indicate relative wear of the friction discs by monitoring the position of the solenoid plunger.

BRIEF DESCRIPTION OF THE DRAWINGS

The invention will become better understood by reference to the following detailed description of the preferred exemplary embodiment when read in conjunction with the appended drawings, wherein like numerals denote like elements and:

FIG. 1 is an exploded perspective view of the brake mechanism embodying the present invention;

FIG. 2 is an enlarged side view and partial cross-section of a brake mechanism embodying the present invention;

FIG. 3 is a further exploded view of the brake mechanism shown in FIG. 1;

FIG. 3a is an enlarged planar view of a separator spring used in the present invention;

FIG. 13 is a perspective view of a limit switch used to indicate friction disc wear; and FIGS. 14-16 are diagrammatic views showing the limit switch in use.

DETAILED DESCRIPTION OF THE PREFERRED EMBODIMENTS

Figure 4:
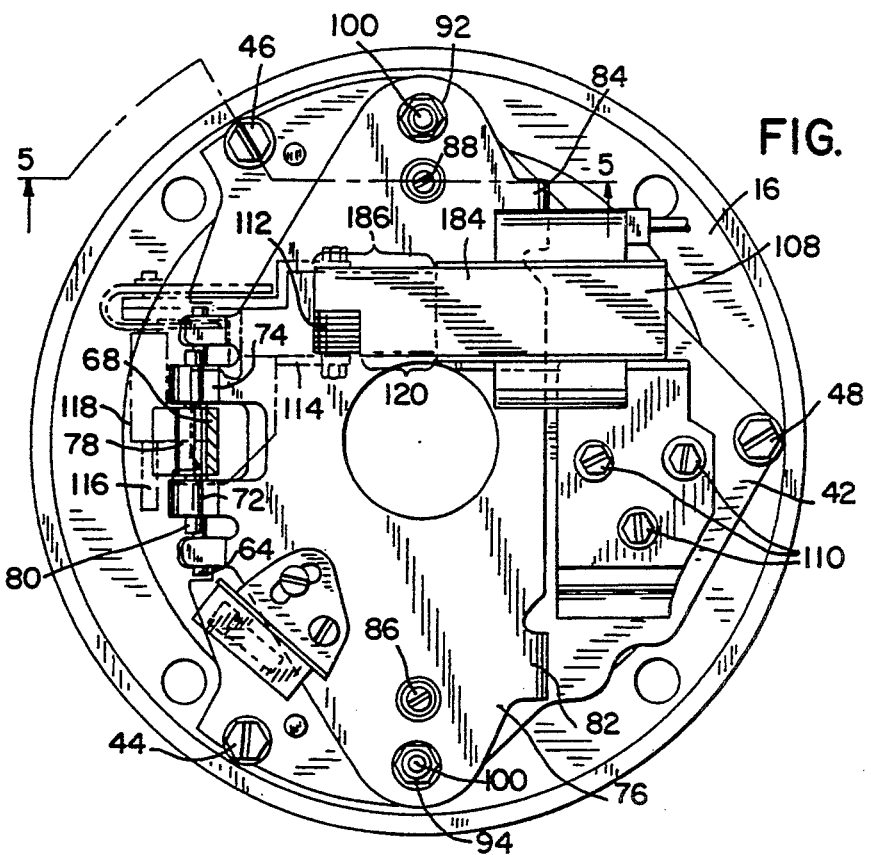
FIG. 4 is a top planar view of the brake mechanism shown in FIG. 3.

FIGS. 1-7 depict a standard brake mechanism 10 for selectively stopping or permitting rotation of a rotatable motor shaft 12 journaled in a motor frame 14. Brake mechanism 10 includes an end plate 16 which receives shaft 12 therethrough and is secured to motor frame 14 by four bolts 18, 20, 22, 24 (FIG. 3). End plate 16 is circular in configuration and is provided about its periphery with an outwardly flaring lip 16a for a purpose to be understood hereafter. Brake mechanism 10 includes one or more friction discs 26, 26a secured to shaft 12 for rotation therewith about the axis of shaft 12. In the preferred embodiment, shaft 12 has a keyed hub 28 mounted thereto by two set screws, such as 30 (FIG. 3) and has circumferential teeth 32 mating with teeth 34 in friction discs 26, 26a. One or more non-rotatable pressure plates 36, 36a, 36b are mounted in end plate 16 for axial movement toward and away from friction discs 26, 26a. Pressure plates 36, 36a, 36b are provided about their circumference with outwardly projecting tabs 38 which are keyed into respective slots 40 formed in end plate 16 at locations 120° apart and are axially slidable in such slots 40.

A support plate 42 is secured to end plate 16 by three screws 44, 46, 48 which are threaded into end plate 16. Support plate 42 carries two mounting studs 50, 52 aligned with respective apertures formed in a protective, hollow, cylindrical housing 54 and received in nuts 56, 58. Housing 54 has a continuous wall 54a and an open end 54b which is disposed to tightly bear against outwardly flaring lip 16a on end plate 16 when nuts 56, 58 are tightened on studs 50, 52. Two fingers 60 (only one of which is seen in FIG. 2) at the top of support plate 42 define a bearing surface 62 for a pivot pin 64 which passes through a bearing end 66 of the solenoid lever 68. A portion 70 of lever 68 extends between two ears 72, 74 formed at the top of a lever arm 76. A bearing 78 is disposed between ears 72, 74 and against bearing end 66, and pivots on a bearing pin 80 disposed in ears 72, 74. The bottom of lever arm 76 has two feet 82, 84 which bear against support plate 42. Lever arm 76 includes two adjustment screws 86, 88 which extend through lever arm 76 as well as support plate 42 and are screw threaded into respective nuts 90 disposed between lever arm 76 and support plate 42. Biasing means is provided by two compression springs 92, 94 biasing lever arm 76 and its adjustment screws 86, 88 towards pressure plate 36 such that pressure plates 36, 36a, 36b engage friction discs 26, 26a and prevent rotation of shaft 12. Compression springs 92, 94 surround respective studs 100 and are compressed between lever arm 76 and stud heads 102, 104. Studs 100 are threaded into respective nuts 106 disposed behind support plate 42.

Figure 5:
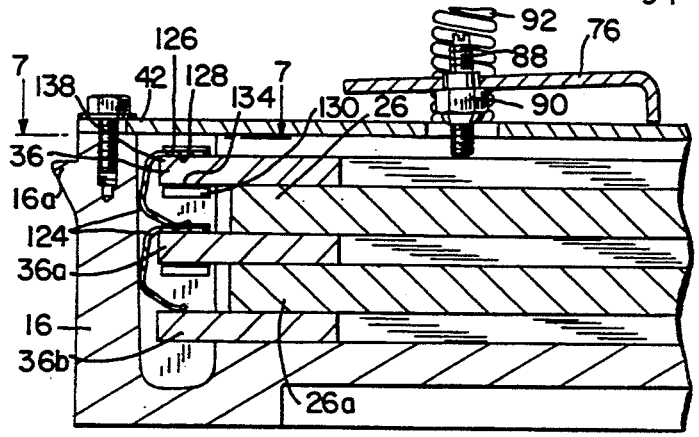
FIG. 5 is an enlarged partial cross-sectional view taken on line 5—5 of FIG. 4 and showing the brake in an applied condition.
Figure 6:
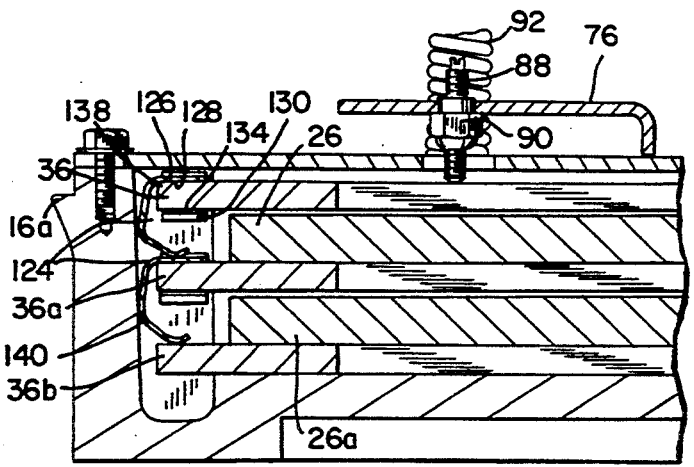
FIG. 6 is a view similar to FIG. 5 showing the brake in a released condition.
Figure 7:
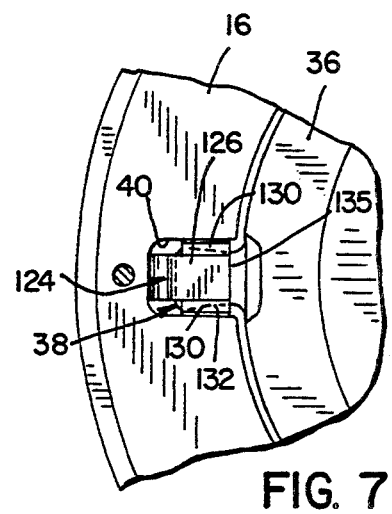
FIG. 7 is an enlarged detail view of a separator spring used in the present invention taken on line 7—7 of FIG. 5.

A solenoid 108 is secured to the bottom of support plate 42 by screws 110 and has a reciprocally movable plunger 112 joined to a bracket 114 pivotally mounted on a bearing pin 116 extending through a connector end 118 of solenoid lever 68. Plunger 112 is movable in a first vertical direction, downwardly in FIG. 2, to a first position pivoting solenoid lever 68 downwardly and causing bearing end 66 to urge bearing 78 away from bearing pin 80. As seen in FIG. 6, this action moves lever arm 76 away from support plate 42 and pressure plate 36 against the bias of springs 92, 94 to release friction discs 26, 26a and permit rotation of shaft 12. Solenoid 108 is electrically wired to be energized at the same time the electric motor assembly is energized. Upon energization of solenoid 108, plunger 112 is magnetically attracted downwardly in FIG. 2 to close gap 120 such that plunger 112 engages solenoid abutment surface 122. Upon de-energization of solenoid 108, plunger 112 moves upwardly returning solenoid lever 68 and bearing 78 and permitting lever arm 76, as shown in FIG. 5, to move under the compression of springs 92, 94 such that pressure plakes 36, 36a, 36b engage friction discs 26, 26a and prevent rotation of shaft 12. A rotatable release mechanism 123 is provided on housing 54 to manually retract plunger 112 so that brake mechanism 10 can be externally released for service or emergency applications.

Adjustment screws 86, 88 of lever arm 76 adjust the range of motion through which lever arm 76 travels to engage pressure plate 36 at the left end of adjustment screws 86, 88 in FIG. 2. Rotation of screws 86, 88 also compensates for wear experienced by friction discs 26, 26a. Brake mechanism 10 has an installed condition mounted to motor frame 14 and a detached condition removed from motor frame 14. Brake mechanism 10 is a self-contained unit in each of such conditions.

As a salient feature of the invention, a plurality of spring clips 124 are slidably attached to and envelope certain peripheral portions of the pressure plates 36, 36a, namely outwardly projecting tabs 38, for urging the pressure plates 36, 36a away from the friction discs 26, 26a when solenoid 108 is energized and the brake is released to minimize brake drag caused by contact of the pressure plates 36, 36a, 36b on friction discs 26, 26a during rotation of motor shaft 12. When the motor and brake are mounted in a vertically oriented position, the gravitational weight of the pressure plates 36, 36a themselves may cause drag on the friction discs 26, 26a and create heat and cause unnecessary wear and shortened life. As noted above, it is known in the prior art to provide leaf springs mounted to the end plate for such purpose and it is also known to provide small low force compression springs for such purpose as shown in the above noted "Stearns Spring Set Disc Brakes Parts List for 55,000 Series" reference FIGS. G, H, I, J and K. In the latter embodiment, the structure is modified by drilling holes in the end plate and in the pressure plates and inserting pins for receiving the low force compression springs. As also noted above, it is known to use low force compression springs around a set of studs spaced circumferentially around the friction discs and mounting the pressure plate means to the end plate means. In the present invention, the minimizing of brake drag is enabled by slidably attaching spring clips 124 around tabs 38 of the pressure plate 36, 36a without otherwise modifying the structure which prevents rotation of pressure plates 36, 36a relative to end plate 16. It should be noted that no spring clips 124 are slidably mounted on pressure plate 36b which is designed to be pressed against end plate 16 during braking. The set of slots 40 formed axially in end plate 16 provides both functions of non-rotatably mounting pressure plates 36, 36a, 36b to end plate 16 and mounting spring clips 124 on tabs 38.

Each of spring clips 124 comprises a top portion 126 extending across an upper surface 128 of tab 38. Wing portions 130 extend laterally from each side of top portion 126 around side surfaces 132 of tab 38 and under a lower surface 134 of tab 38. As seen best in FIG. 7, tab 38 is provided with a rear stop surface 135 against which spring clip 124 is firmly held. A leaf spring portion 136 extends from top portion 126 around in spaced relation to front surface 138 and lower surface 134 of tab 38. Leaf spring portion 136 is engageable between adjacent pressure plates 36, 36a, 36b at locations defined by tabs 38. Each of wing portions 130 and leaf spring portion 136 are formed with rounded sections 140 effective to prevent tab from rattling in slots 40 during operation of brake mechanism 10 and providing noise suppression comparable to anti-rattle leaf spring 84 in above noted U.S. Pat. No. 4,798,269. Additional noise suppression is provided by hub stabilizing springs 142 comparable to hub stabilizing spring 92 of U.S. Pat. No. 4,798,269. Hub stabilizing springs 142 are disposed between an outer edge 144 of a respective "double tooth" 146 of hub 28 and a respective inner radial surface 148 of respective friction disc 26a. Hub stabilizing springs 142 apply a slight radial force against the friction discs 26, 26a to take up backlash and muffle backlash noise that occurs between hub 28 and friction discs 26, 26a when the motor is started and stopped, as in U.S. Pat. No. 4,798,269.

In contrast with the prior art, spring clips 124 prevent the tabs 38 of the pressure plates 36a, 36b from being thrusted into the slot edge 150 from rotational forces during a stop and from gouging the end plate slots 40, thereby reducing braking torque. In addition, spring clips 124 of the present invention have universal application irregardless of brake application, i.e. manufacture and replacement of different sized spring clips is not necessary, which makes orientation-free mounting much easier than in the prior art.

Figure 8:
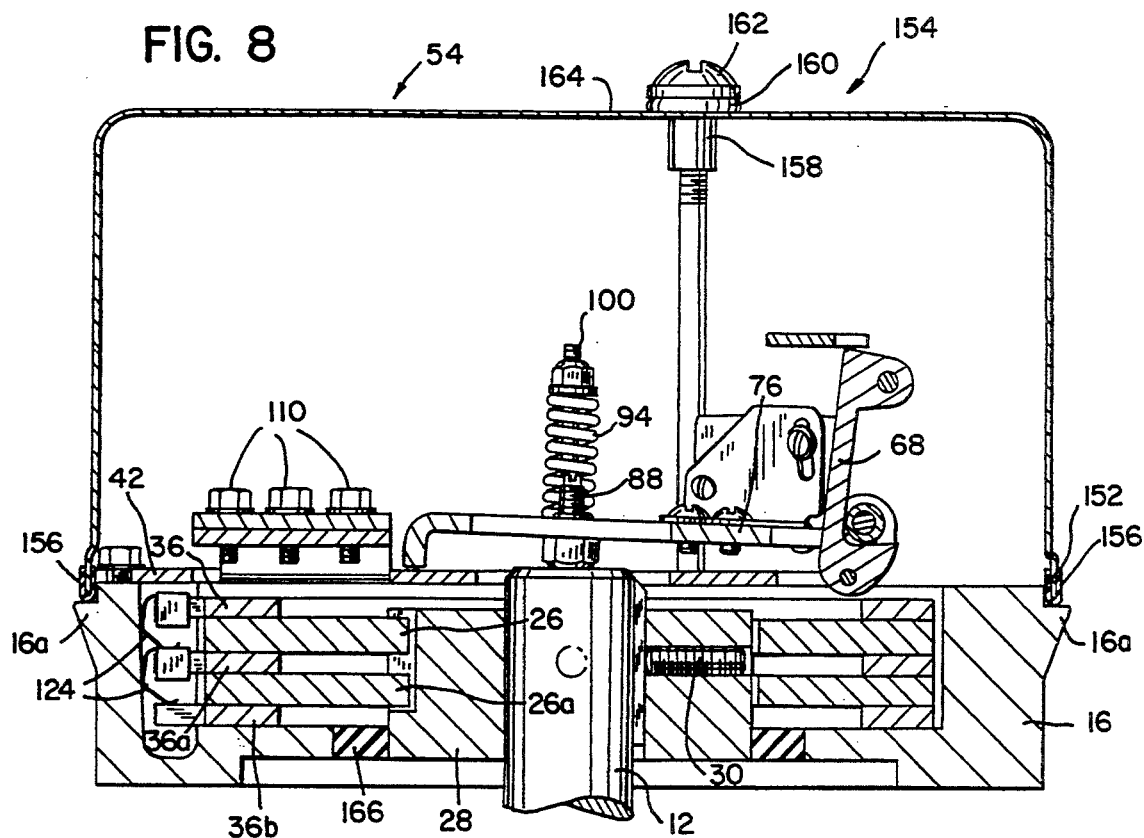
FIG. 8 is a partial cross-sectional view of a dust-tight, waterproof brake arrangement embodying the present invention.
Figure 9:
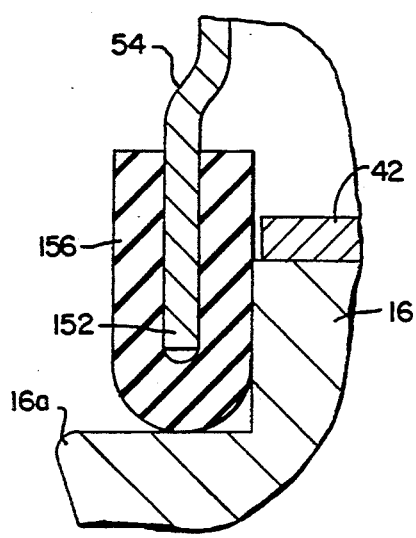
FIG. 9 is an enlarged detail view in cross-section showing the sealing arrangement used with the arrangement shown in FIG. 8.
Figure 10:
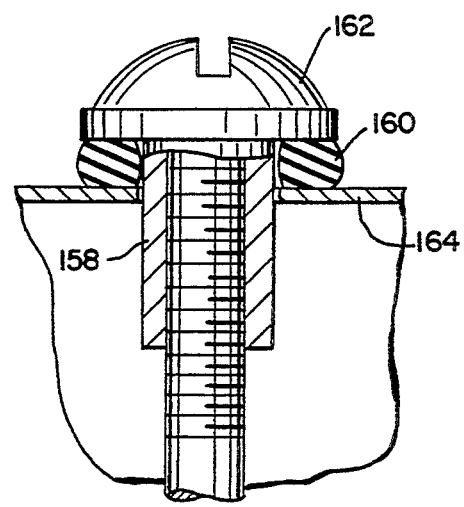
FIG. 10 is an enlarged detail view in cross-section showing the sealing used on the housing fasteners of the arrangement shown in FIG. 8.
Figure 11:
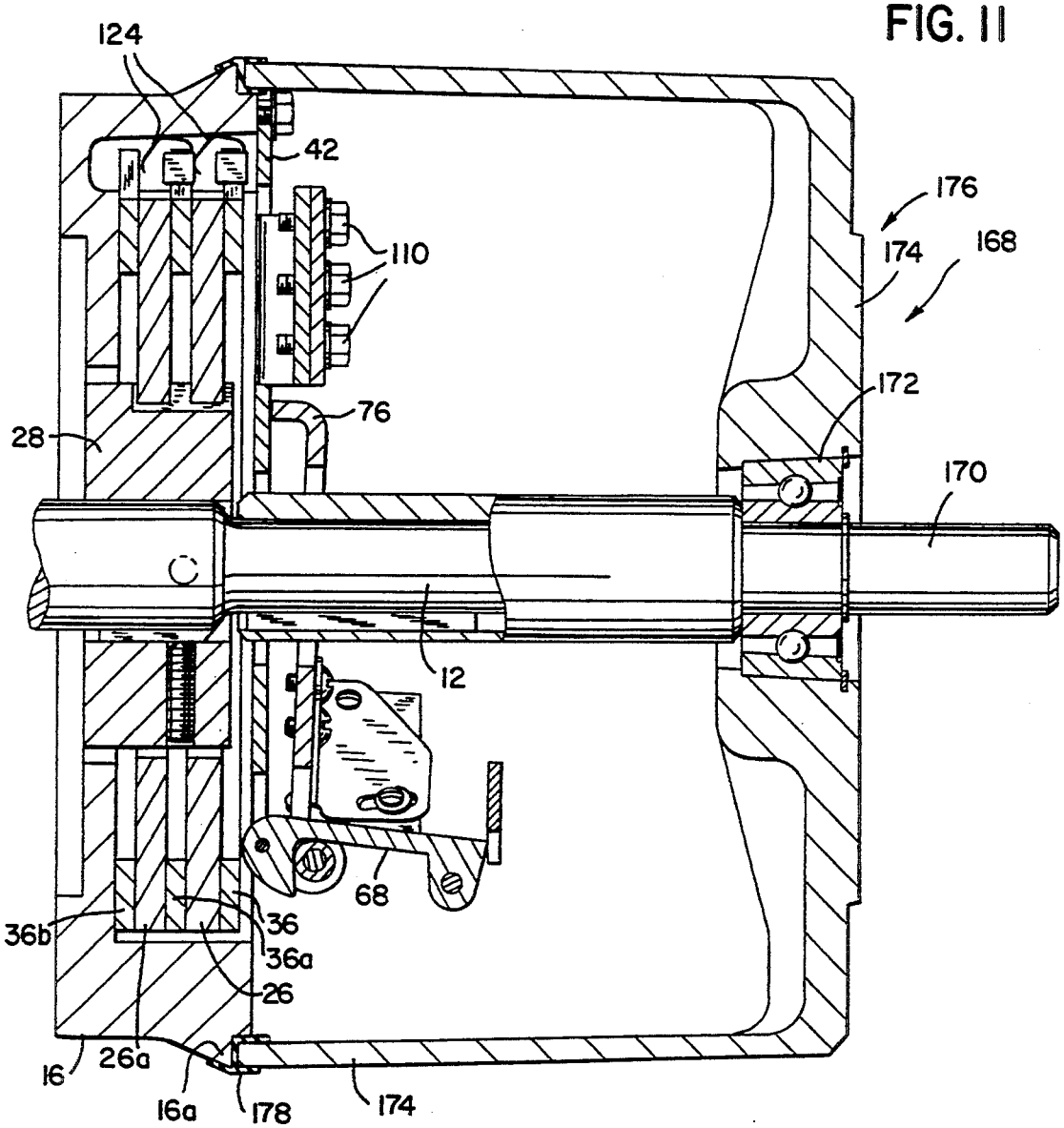
FIG. 11 is a partial view in cross-section of a coupler brake arrangement embodying the present invention.
Figure 12:
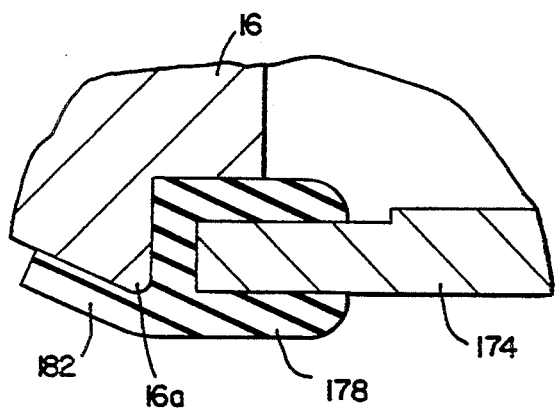
FIG. 12 is an enlarged detail view in cross-section of the seal arrangement used in the arrangement of FIG. 11.

As a further feature of the invention, various sealing arrangements are contemplated for surrounding the open end 54a of the housing 54 for sealing the juncture between end plate 16 and housing 54. In the arrangement shown in FIGS. 8-10, a dust-tight, waterproof brake mechanism 154 is provided by wrapping a U-shaped gasket 156 around open end 152 of housing 54 and encircling housing fasteners 158 with sealing rings 160 between the heads 162 of the fastener 158 and the wall 164 of housing 54. Hub 28 is provided with a radial seal 166 retained in end plate 16 on an end adjacent to motor frame 14. In FIGS. 11 and 12, a coupler brake assembly 168 is provided wherein a shaft extension 170 is coupled to motor shaft 12 and passes through a set of bearings 172 mounted on a wall 174 of housing 176 for connection to a gear coupler or the like mounted on the outside of housing 176. In this arrangement, a Y-shaped seal 178 is wrapped around open end 180 of housing 176 and has a leg portion 182 which extends past the junction of end plate 16 and housing 176 on the outer surface of end plate 16 to provide a labyrinth especially difficult for contaminants to enter.

As seen in FIGS. 1-4 and FIGS. 14-16, brake mechanism 10 includes a thin, flat plastic decal 184 fixed by adhesive or the like to and extending beyond a side surface of solenoid 108. Decal 184 functions as a visual wear indicator to reflect the size of air gap 120 when plunger 112 is in a de-energized or released position. It should be noted that the proper setting of air gap 120 is essential to efficient operation of brake mechanism 10. If the air gap setting is spaced too widely apart, torque forces will not be strong enough to exert sufficient clamping pressure against frictional discs 26, 26a and end plate 16. For example, in a brake mechanism having two friction discs, 26, 26a, an operator may set the preferred air gap 120 (FIG. 4) at 7/16" relative to the prescribed maximum air gap 186 (FIG. 4) of 11/16". As the friction discs 26, 26a wear, lever arm 76 moves proportionately closer to support plate 42 causing solenoid lever 68 and bracket 114 to move to the left in FIG. 4 which in turn increases the size of air gap 120. When the operator services brake mechanism 10 and notes that air gap 120 has approached or exceeded the maximum air gap 186, screws 86, 88 are adjusted accordingly to reset air gap 120.

As yet a further feature of the invention, a limit switch 188 (FIG. 13) is mounted to movable lever arm 76 by a bracket 190 having an aperture 192 and a slot 194 for receiving fasteners 196, 198 screw threaded into lever arm 76. Slot 194 allows limit switch 188 to be variably positioned in a horizontal plane on the flat face surface of lever arm 76. Bracket 190 also includes aperture 200 and slot 202 for receiving fasteners 204, 206 screw threaded into limit switch 188. Slot 202 allows limit switch 188 to be variably positioned in a vertical plane relative to lever arm 76. Referring to FIGS. 14-16, limit switch 188 also includes a pivot arm 207 carrying a movable switch roller 208 depending downwardly alongside lever arm 76 and normally held spaced from support plate 42 by adjusting fastener 206 in slot 202 of bracket 190. Pivot arm 207 is engageable with a depressible switch button 209 located on the bottom of switch 188. Blade terminals 210, 212 are provided on limit switch 188 for connection to a suitable visual and/or audible alarm device (not shown). In FIG. 14, with plunger 112 de-energized and set at the preferred air gap 120, the operator sets switch 188 so that pivot arm 207 and switch roller 208 will not trip switch 188. In FIG. 15, with plunger 112 energized, the left side of lever arm 76 is pivoted upwardly so as to correspondingly move switch 188 mounted thereon away from support plate 42. In FIG. 16, when plunger 112 is again de-energized and because of friction disc wear reaches maximum air gap 186, the left side of lever arm 76 pivots downwardly, causing pivot arm 207 and switch roller 208 to deflect upwardly forcing switch button 209 to be depressed. This action trips switch 188 to provide an automatic indication, such as by light or buzzer, that air gap 120 needs to be reset.

It should be appreciated that the present invention provides a reduced diameter hub which requires less material to manufacture and costs much less than prior art hubs. In addition, the present invention offers a universally-sized end plate in addition to the universally-sized separator springs, both of which reduce production costs and enable easy replacement of these components when necessary. Unlike the prior art, the separator springs are notable not only for minimizing brake drag and suppressing noise, but for significantly reducing wear inflicted upon the pressure plates during braking so that braking torque can be maintained.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A brake mechanism for selectively stopping and permitting rotation of a shaft journaled in a motor frame, comprising:
   end plate means mounted to said motor frame;
   support plate means mounted to said end plate means;
   friction disc means mounted between said end plate means and said support plate means and secured to said shaft for rotation therewith about the longitudinal axis of the shaft;
   non-rotatable pressure plate means having certain peripheral portions slidably mounted in said end plate means between said support plate means and said friction disc means and axially movable toward and away from said friction disc means;
   lever arm means mounted to said support plate means for movement toward and away from said pressure plate means;
   biasing means biasing said lever arm means against said pressure plate means such that said pressure plate means engages said friction disc means and prevents rotation of said shaft;
   solenoid means secured to said support plate means and having a reciprocally movable plunger operatively connected to said lever arm means, and axially movable to a first position moving said lever arm means in one axial direction against the bias of said biasing means to release said friction disc means and permit rotation of said shaft, said plunger being axially movable to a second position permitting said lever arm means to move under the bias of said biasing means in the opposite axial direction and engage said pressure plate means such that said pressure plate means engages said friction disc means and prevents rotation of said shaft; and
   separator means enveloping said certain peripheral portions of said pressure plate means for urging said pressure plate means away from said friction disc means in said first position of said plunger to minimize brake drag caused by contact of said pressure plate means and said friction disc means during rotation of said shaft, and for suppressing noise and wear caused by contact of said certain peripheral portions of said pressure plate means relative to said end plate means during operation of said brake mechanism,
   wherein said end plate means is circular in configuration and is formed with a series of slots formed therein at locations spaced 120° apart,
   wherein said end plate means is provided with an outwardly flaring lip about its periphery,
   wherein said certain peripheral portions of said pressure plate means are formed as outwardly projecting tabs keyed into and slidable in said slots,
   wherein each of said tabs comprises an upper surface, a lower surface, rounded side surfaces, a front surface and a rear stop surface,
   wherein said separator means comprises a plurality of spring clips,
   and wherein each of said spring clips comprises a top portion extending across said upper surface of said tab, wing portions extending laterally from each side of said top portion around said side surfaces of said tab and under said lower surface of said tab, and a leaf spring portion extending from said top portion around and in spaced relation to said front surface and said lower surface of said tab.

2. The brake mechanism of claim 1, wherein said leaf spring portion is engageable between adjacent ones of said pressure plate means at locations defined by said tabs.

3. The brake mechanism of claim 2, wherein each of said wing portions and said leaf spring portion are formed with rounded sections effective to prevent said tabs from gouging into and rattling in said slots during operation of said brake mechanism.

4. The brake mechanism of claim 1, including a hollow cylindrical housing having a continuous wall and an open end engageable against said outwardly flaring lip on said end plate means.

5. The brake mechanism of claim 4, including a U-shaped gasket wrapped around said open end of said housing.

6. The brake mechanism of claim 5, including a hub secured to said shaft, said hub being provided with a radial seal retained in said end plate means on an end adjacent said motor frame.

7. The brake mechanism of claim 6 including a plurality of studs extending axially away from said support plate means through said wall of said housing, said studs being engageable with respective fasteners having heads spaced from said wall of said housing by sealing rings encircling said fasteners between said heads and said wall of said housing to provide a dust-tight, waterproof seal and retain said housing in position against said end plate means.

8. The brake mechanism of claim 1, wherein said brake mechanism is mounted over and above said shaft.

9. A brake mechanism for selectively stopping and permitting rotation of a shaft journaled in a motor frame, comprising:

end plate means mounted to said motor frame;

support plate means mounted to said end plate means;

friction disc means mounted between said end plate means and said support plate means and secured to said shaft for rotation therewith about the longitudinal axis of the shaft;

non-rotatable pressure plate means having certain peripheral portions slidably mounted in said end plate means between said support plate means and said friction disc means and axially movable toward and away from said friction disc means;

lever arm means mounted to said support plate means for movement toward and away from said pressure plate means;

biasing means biasing said lever arm means against said pressure plate means such that said pressure plate means engages said friction disc means and prevents rotation of said shaft;

solenoid means secured to said support plate means and having a reciprocally movable plunger operatively connected to said lever arm means, and axially movable to a first position moving said lever arm means in one axial direction against the bias of said biasing means to release said friction disc means and permit rotation of said shaft, said plunger being axially movable to a second position permitting said lever arm means to move under the bias of said biasing means in the opposite axial direction and engage said pressure plate means such that said pressure plate means engages said friction disc means and prevents rotation of said shaft;

separator means enveloping certain peripheral portions of said pressure plate means for urging said pressure plate means away from said friction disc means in said first position of said plunger to minimize brake drag caused by contact of said pressure plate means and said friction disc means during rotation of said shaft, and for suppressing noise and wear caused by contact of said certain peripheral portions of said pressure plate means relative to said end plate means during operation of said brake mechanism; and switch means mounted to said lever arm means for sensing a third position of said plunger beyond said second position permitting said lever arm means to move further under the bias of said biasing means in the opposite axial direction, wherein said switch means is adjustable along a vertical plane and a horizontal plane relative to said lever arm means.

10. The brake mechanism of claim 9, wherein said switch means includes a movable roller selectively engageable with said support plate means.

11. The brake mechanism of claim 9, wherein said switch means senses the relative wear of said friction disc means.

12. The brake mechanism of claim 9, wherein said switch means is constructed and arranged to monitor a predetermined gap between said plunger and said solenoid means.

* * * * *